April 26, 1932.  C. D. GAUDREAU  1,855,479
TAPPING DEVICE
Filed Sept. 11, 1930
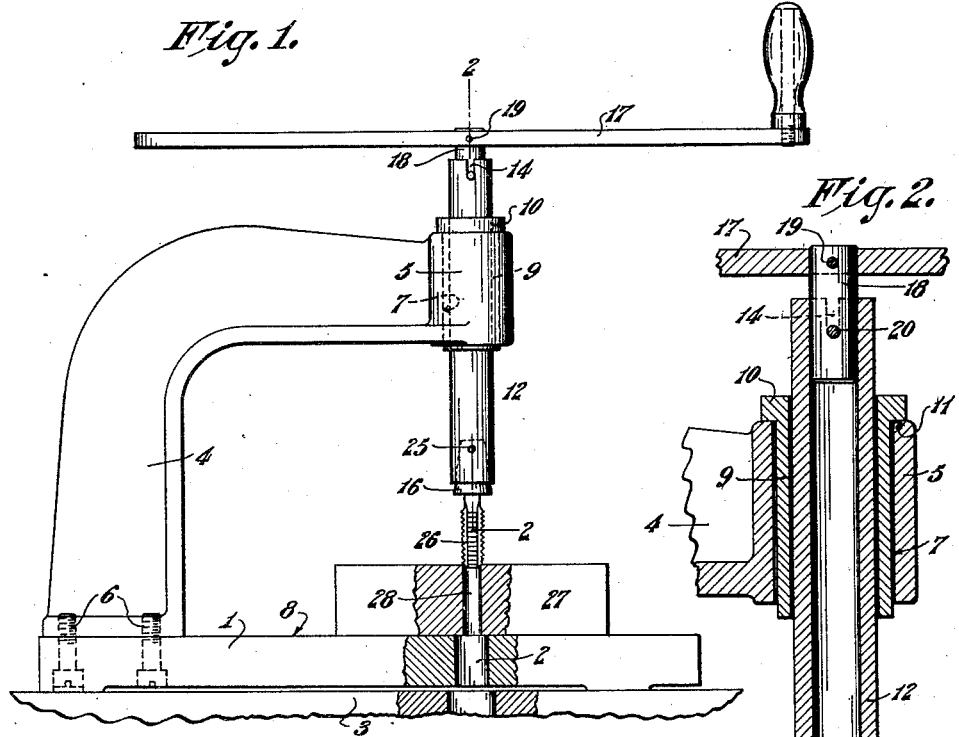
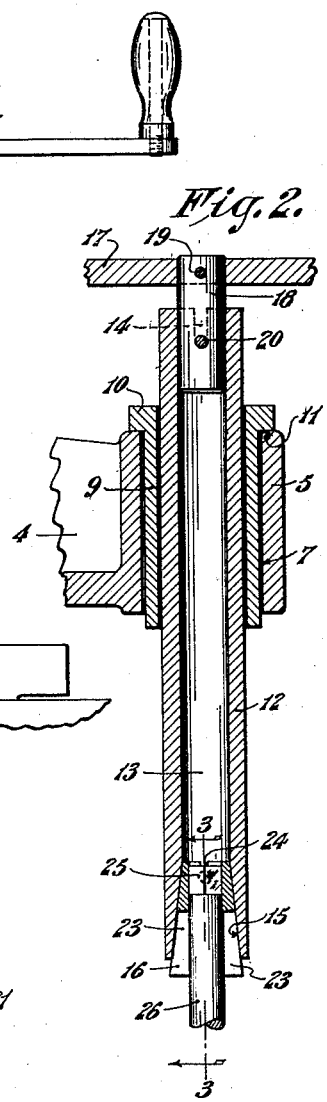
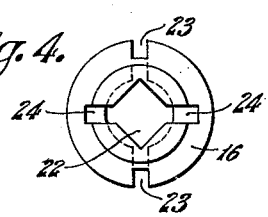
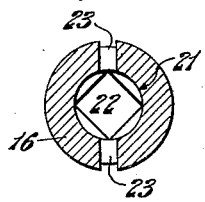
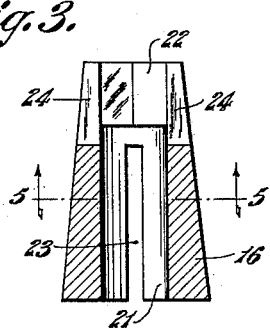
INVENTOR,
Charles D. Gaudreau,
BY
Harry W. Bowen.
ATTORNEY.

Patented Apr. 26, 1932

1,855,479

UNITED STATES PATENT OFFICE

CHARLES D. GAUDREAU, OF SPRINGFIELD, MASSACHUSETTS, ASSIGNOR TO BAY STATE TOOL & MACHINE CO., OF SPRINGFIELD, MASSACHUSETTS, A CORPORATION OF MASSACHUSETTS

TAPPING DEVICE

Application filed September 11, 1930. Serial No. 481,109.

My invention relates to improvements in tapping devices.

An object of my invention is to provide a device which will accurately retain or hold a hand operated tap in a plumb and true position, relative to the work, while tapping a drilled hole in a piece of work.

A further object of my invention is to porvide means whereby the different sized taps may be quickly and easily changed, without the use of tools of any kind. Heretofore, the usual practice in tapping a hole in a piece of work is to clamp the piece in a bench vise, or other tool, the tap is secured in the usual tap wrench. The operator then rotates the tap, taking special care to maintain the tap in accurate relation to the axis of the hole being tapped, or in other words, to maintain the tap at right angles to the piece of work. This is always a difficult matter to do and often the tap is broken in the operation. My invention is particularly designed to remove and overcome these and other objections by means of the apparatus, or device herein shown and described.

I accomplish these objects with the device illustrated in the accompanying drawings, in which:

Fig. 1 is a side elevational view, partially in section, showing a piece of work in place and the tap about to enter the drilled hole.

Fig. 2 is a sectional view on the line 2—2 of Fig. 1, on an enlarged scale illustrating the tap retaining cone.

Fig. 3 is a vertical sectional view on the line 3—3 of Fig. 2.

Fig. 4 is a plan view of the top of the conical shaped chuck shown in Fig. 3, and Fig. 5 is a plan section on the line 5—5 of Fig. 3 illustrating the upper end of the tap in place and two of the vertical slits.

Referring to the drawings in detail, in which like numerals refer to like parts throughout:

A base 1, having a hole 2, through which the chips from the tapping operation may fall, is secured to a bench or other convenient surface 3. 4 indicates an arc-shaped bracket member formed with a boss portion 5, at its outer or upper end. This member is secured to the base 1 with the machine screws 6. A hole, or opening 7, is accurately reamed through the boss 5, its axis being perpendicular to the upper work receiving surface 8 of the base 1. A bearing sleeve 9 formed with a shouldered or flange portion 10, is mounted in the reamed opening 7 with the shouldered part 10 resting on the upper surface 11 of the boss 5. This sleeve may be either pressed into the opening of the boss 5, or it may have a sliding fit therein. Slidably mounted in the sleeve 9 is a tubular shaft 12, having an opening 13 drilled therethrough, as shown. At the upper end of this shaft is cut the two notches 14, and at the opposite or lower end of the shaft, the opening 13 is enlarged and tapered, as indicated at 15, to form a conical-shaped bearing for the tapered and conical-shaped chuck 16, shown in detail in Fig. 3. An operating handle 17, for the purpose of turning or rotating the shaft 12, is supported at its upper end by means of the stud 18, which is secured to the handle with the pin 19, and, another pin 20, extends through the stud and projecting diametrically on each side, performs the dual function of providing a bearing for the handle 17 in the notches 14 of the shaft 12, and a key for rotating the shaft with the handle. The tapered tap retaining clutch 16 is formed with an axial and round opening 21, for a portion of its length and a square opening 22 at its upper end to receive the square shaped end of the shank of the tap. Oppositely disposed notches 23 are formed in the bottom end of the chuck, and oppositely disposed notches 24 in the upper end of the chuck. The two notches 24 are at right angles to the two notches 23, as shown. A pin 25, fixed in the wall of the shaft 12, engages one of the notches 24 of the clutch 16, thereby acting as a key to turn the clutch 16 and the tap therein, when the shaft 12 is rotated with the handle 17.

A tap 26 is shown inserted in the chuck with the round shank of the tap engaging the round hole 21 of the chuck and the square head of the tap fitting in the square hole 22 of the chuck. The chuck is then pressed into the tapered end 15 of the shaft causing the notches, or slits 23 and 24, of the chuck to contact under pressure of the tapered fit, thereby gripping the tap lightly.

In practice, a piece of work 27 having a drilled hole 28 therein, is placed on the surface 8 of the base 1, with the hole 28 to be tapped axially or plumb under the axis of the sleeve 9. A shaft 12, with its chuck 16 and tap 26, is then inserted in the sleeve 9 and allowed to slide downward, until the tap rests in the top of the hole 28. The handle 17 is then inserted in the top of the shaft 12, with the pin 20 in the recesses 14, then by turning the handle, and thereby the shaft 12, chuck 16, and tap 26, the hole 28 will be tapped. As the shaft 12 is accurately guided by the comparatively long bearing sleeve 9, it will be seen that the shaft, chuck and tap must travel in a true, plumb line perpendicular to the work to be tapped.

Taps may be changed by removing the handle and inserting a rod in the hole 13; by giving the rod a sharp tap or blow, the chuck will drop out. Another tap may then be inserted in the chuck and the chuck pressed back into the shaft. However, a preferred method is to provide, or assemble, a series of shafts, each equipped with a chuck and tap. Thus a change in tap size may be quickly accomplished by lifting off the handle, removing the shaft, inserting a second shaft and setting the handle back on the second shaft, materially saving time for the different tapping operations.

What I claim is:

1. In a hand tapping device, a tapered chuck to hold the tap, said chuck having slots arranged in its walls, whereby the chuck may be compressed to grip the tap, a shaft having the same external diameter throughout to hold the chuck, a hole through said shaft, said hole being tapered at one end to receive the tapered chuck, means for revolving the chuck with the shaft, said means consisting of a pin in the wall of the shaft which engages a slot in the wall of the chuck, means on the opposite end of the shaft for removably supporting a lever and handle, said means comprising a slotted end in which is engaged a pin on said lever, whereby the shaft may be revolved, a sleeve to guide the shaft in a line at right angles to the work to be tapered, a bracket to support said sleeve, said bracket being secured to a base having a flat surface, so disposed as to support the work to be tapped under said sleeve.

2. In a tool holder, the combination of a straight shaft, having the same external diameter throughout and an axial opening therein, one end of said opening being tapered or conical-shaped to receive a tapered chuck, the opposite end of said opening having slotted means for removably supporting therein the hub of a crank, or handle, and a tapered chuck, removably secured in said shaft.

3. A hand tapping machine, comprising in combination, of a bracket member, a sleeve therein, a tubular member having the same outside diameter throughout its length slidable in the sleeve, and having one end of the opening of the tubular member formed with a conical surface, a cone-shaped chuck formed with two sets of slits extending from opposite ends of said chuck, and an opening to receive the shank of a tool, as a tap, whereby, when the cone is inserted in the conical opening, the shank of a tool will be gripped, and means for rotating the tubular member.

4. A hand tapping machine, comprising in combination, of a bracket member, a sleeve therein, a tubular member having the same outside diameter throughout its length slidable in the sleeve, and having one end of the opening of the tubular member formed with a conical internal surface, a cone-shaped chuck formed with two sets of slits and an opening to receive the shank of a tool, as a tap, whereby, when the cone is inserted in the conical opening, the shank of a tool will be gripped, and means for rotating the tubular member, said slits being arranged at right angles to each other and extending from the opposite ends of the cone-shaped member.

5. In a tapping device having a base member and a guide member secured above said base member, a tap holder slidably and removably guided in said guide member comprising a straight shaft of the same external diameter throughout its length formed with an axial bore tapered at one end and a pair of oppositely disposed slots through its walls at the opposite end and a tapered chuck member adapted to fit in and be compressed by the tapered end of said axial bore, said chuck member being formed with a plurality of slots extending from one end and a plurality of slots extending from the opposite end and spaced between the first mentioned slots.

CHARLES D. GAUDREAU.

CERTIFICATE OF CORRECTION.

Patent No. 1,855,479.                                 Granted April 26, 1932, to

CHARLES D. GAUDREAU.

It is hereby certified that error appears in the printed specification of the above numbered patent requiring correction as follows: Page 2, line 52 and 53, claim 1, for the word "tapered" read tapped; and that the said Letters Patent should be read with this correction therein that the same may conform to the record of the case in the Patent Office.

Signed and sealed this 21st day of June, A. D. 1932.

(Seal)                                                M. J. Moore,
                                                       Acting Commissioner of Patents.